US012213040B2

(12) United States Patent
Soryal et al.

(10) Patent No.: US 12,213,040 B2
(45) Date of Patent: Jan. 28, 2025

(54) AUTONOMOUS VEHICLE PAIRING MANAGEMENT

(71) Applicant: AT&T Intellectual Property I, L.P., Atlanta, GA (US)

(72) Inventors: Joseph Soryal, Glendale, NY (US); Howard L. Lang, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 316 days.

(21) Appl. No.: 17/826,269

(22) Filed: May 27, 2022

(65) Prior Publication Data
US 2023/0388761 A1 Nov. 30, 2023

(51) Int. Cl.
*H04B 7/00* (2006.01)
*G08G 1/00* (2006.01)
*H04W 4/46* (2018.01)

(52) U.S. Cl.
CPC .............. *H04W 4/46* (2018.02); *G08G 1/22* (2013.01)

(58) Field of Classification Search
CPC ........... H04W 4/46; H04W 4/48; H04W 4/80; G08G 1/22
See application file for complete search history.

(56) References Cited

U.S. PATENT DOCUMENTS

| 10,712,748 | B2 * | 7/2020 | Smartt | ............... | B60W 30/165 |
| 11,159,931 | B1 * | 10/2021 | Mittal | ................. | G06F 3/0488 |
| 2022/0067868 | A1 * | 3/2022 | Chen | ................. | G07C 9/00571 |

* cited by examiner

Primary Examiner — Tuan Pham
(74) Attorney, Agent, or Firm — Hartman & Citrin LLC

(57) ABSTRACT

Concepts and technologies disclosed herein are directed to autonomous vehicle pairing management. According to one aspect disclosed herein, a fleet pairing management application executed by a processor of an autonomous vehicle can initiate a fleet pairing process with a plurality of other autonomous vehicles, each of which can execute one of a plurality of other fleet pairing management applications. The fleet pairing management application can send, over a network, an initiate network pairing request to the plurality of other autonomous vehicles. The fleet pairing management application can receive a confirm network pairing response from at least one other autonomous vehicle of the plurality of other autonomous vehicles. A fleet can then be established. The fleet can include the autonomous vehicle and the at least one other autonomous vehicle of the plurality of other autonomous vehicles. The autonomous vehicles in the fleet can then share data among the fleet.

20 Claims, 11 Drawing Sheets

AUTONOMOUS VEHICLE PAIRING MANAGEMENT

BACKGROUND

Autonomous vehicles will require sophisticated on-board sensor systems and connectivity with other vehicles, pedestrians, road infrastructure, and networks to operate safely and effectively. Technologies such as vehicle-to-vehicle ("V2V") communications, vehicle-to-pedestrian ("V2P"), and vehicle-to-infrastructure ("V2P") communications allow vehicles to communicate directly with other vehicles, pedestrians, and road infrastructure (e.g., lane markings, road signs, and traffic lights). Many current vehicles utilize these technologies for safety features such as lane keep assist, lane change assist, and autonomous modes.

Third Generation Partnership Project ("3GPP") has developed a technology called cellular vehicle-to-everything ("C-V2X"). C-V2X utilizes existing cellular networks (e.g., Long-Term Evolution "LTE") to facilitate network-based connectivity among vehicles, between vehicles and pedestrians (e.g., via user devices such as smartphones), between vehicles and infrastructure, and between vehicles and remote networks (e.g., cloud networks). In this manner, C-V2X improves upon former direct (often line-of-sight) vehicular communication technologies such as V2V, V2P, and V2I. For example, C-V2X can provide 360-degree non-line-of-sight awareness for vehicles that can support a higher level of predictability for improved road safety as an advancement towards autonomous driving. C-V2X also can provide a platform to support vehicle-to-cloud ("V2C") applications for information, entertainment, and connected car services.

Autonomous vehicles will be heavily used in the near future, especially in first responder transports and in the trucking industry, as well as other use cases where multiple vehicles from different manufacturers need to form a fleet. Presently, there is no mechanism to perform autonomous vehicle pairing between two or more autonomous vehicles to ensure the autonomous vehicles can operate effectively as a fleet, such as traveling together, following the same route, making the same stops, maintaining the same speed, waiting in certain areas to enter a facility one-by-one in a coordinated fashion, among other coordinated operations.

SUMMARY

Concepts and technologies disclosed herein are directed to aspects of autonomous vehicle pairing management. According to one aspect disclosed herein, an autonomous vehicle can execute, via one or more processors, a fleet pairing management application ("FPMA") to initiate a fleet pairing process with a plurality of other autonomous vehicles. Each of the plurality of other autonomous vehicles can execute one of a plurality of other FPMAs. The autonomous vehicle and the other autonomous vehicles may be different makes, models, and/or trims. As a result, the autonomous vehicle pairing management disclosed herein can be vehicle agnostic. This offers several benefits over proprietary technologies that work only with specific makes, models, and/or trims. It should be understood, however, that the autonomous vehicles and the other autonomous vehicles may be the same or similar makes, models, and/or trims.

The FPMA can send, over one or more networks, an initiate network pairing request to the plurality of other autonomous vehicles. In some embodiments, the network(s) include a mobile telecommunications network. In other embodiments, the network(s) include a packet data network. The packet data network may be a vehicle network established among two or more autonomous vehicles. In response to the initiate network pairing request, the FPMA can receive a network pairing response from at least one other autonomous vehicle of the plurality of other autonomous vehicles. Each network pairing response can confirm or deny pairing for the associated FPMA. In some embodiments, the initiate network pairing request and the network pairing response can include one or more security credentials.

A fleet can then be established with the autonomous vehicle and the at least one other autonomous vehicle of the plurality of other autonomous vehicles that confirmed the initiate network pairing request. As a fleet, the autonomous vehicles can communicate to share data to ensure effective operation as a fleet, such as traveling together, following the same route, making the same stops, maintaining the same speed, waiting in certain areas to enter a facility one-by-one in a coordinated fashion, among other coordinated operations. The data can include vehicle data associated with one or more vehicle systems, one or more vehicle sensors, or both one or more vehicle systems and one or more vehicle sensors. The data also can include map data. The map data can include latitude and longitude location data, street data, topology data, navigation data, and the like.

In some embodiments, the FPMA can detect an exception condition derived from the data. The exception condition can be any condition that is outside a given set of parameters. The set of parameters can include vehicle parameters such as speed, location, direction of travel, energy capacity (e.g., fuel capacity or battery capacity remaining), and/or other parameters associated with the operation of the autonomous vehicles. The FPMA can determine an exception condition response. The exception condition response can be used by the FPMA to instruct the other FPMAs in the fleet to perform one or more actions to mitigate the effect(s) of the exception condition. For example, if the exception condition relates to a low fuel warning of the autonomous vehicle, the FPMA can determine a nearby fueling station, calculate the time needed to acquire fuel sufficient to at least arrive at the target location, and instruct the other autonomous vehicles to also plan a fueling stop to maximize efficiency of downtime by the autonomous vehicle. Alternatively, the exception condition response can instruct the other autonomous vehicles to change speed, select an alternate route, make a scheduled stop, enter a holding pattern (e.g., repeat a section of pre-determined route instructions), or any other way in which the other autonomous vehicles can mitigate, at least in part, the effect(s) of the exception condition. The FPMA can provide the exception condition response to each of the other autonomous vehicles, which, in turn, can execute the action(s) identified in the exception condition response to mitigate the effect(s) of the exception condition.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
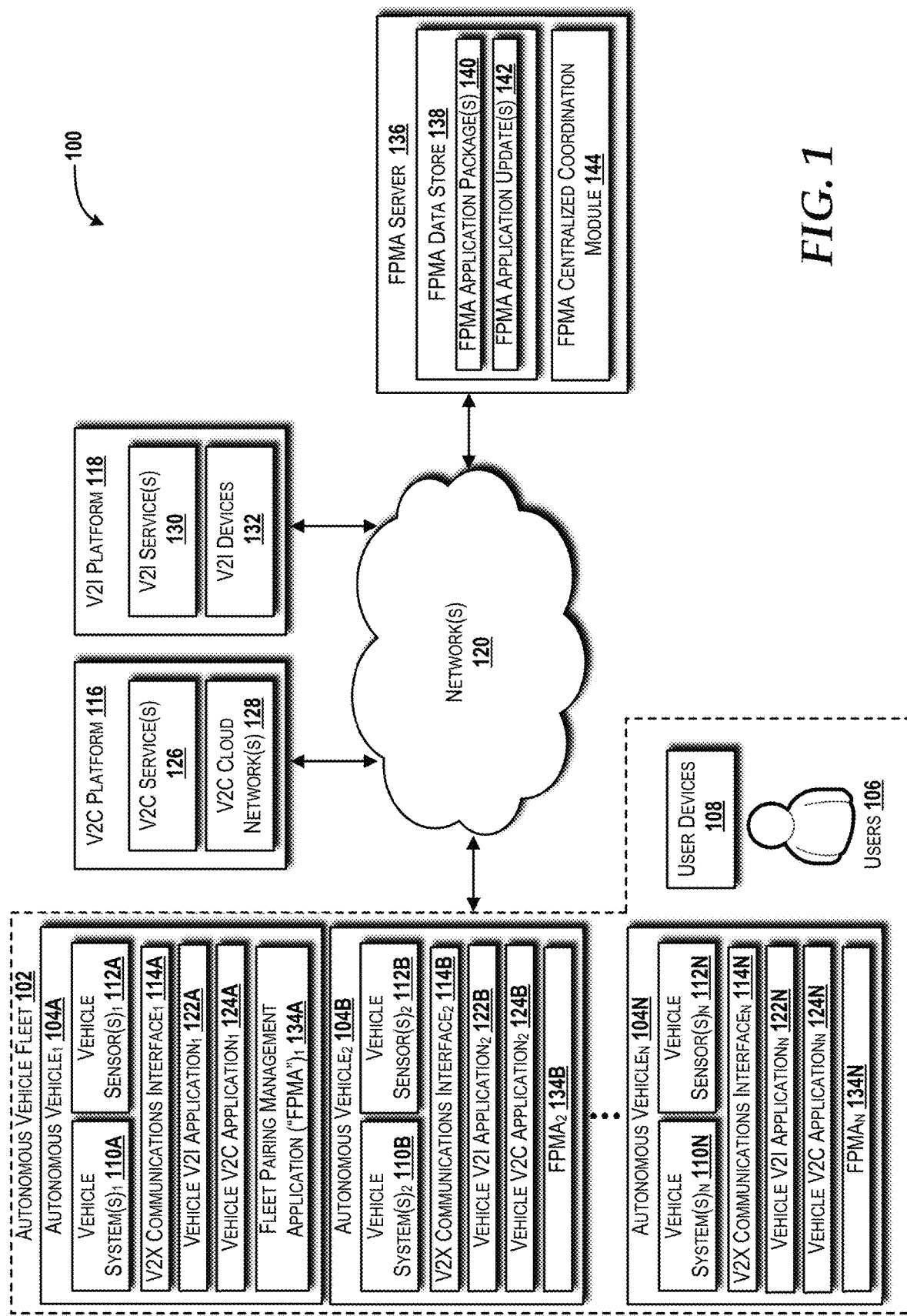
FIG. 1 is a diagram illustrating aspects of an illustrative operating environment in which various concepts and technologies disclosed herein can be implemented.

Turning now to FIG. 1, an operating environment 100 in which embodiments of the concepts and technologies disclosed herein will be described. The operating environment 100 includes an autonomous vehicle fleet 102 that includes a plurality of autonomous vehicles 104A-104N (hereafter referred to individually as "autonomous vehicle 104" or collectively as "autonomous vehicles 104"). Each of the autonomous vehicles 104 can be a car, truck, van, motorcycle, moped, go-kart, golf cart, tank, ATV, or any other ground-based vehicle. It should be understood, however, that aspects of the concepts and technologies disclosed herein can extend to other vehicles that have amphibious and/or flight capabilities. The autonomous vehicles 104 can accommodate any number of vehicle occupants (shown as "users 106"), each of whom can be a driver (backup if autonomy fails for some reason) or a passenger of one of the autonomous vehicles 104.

The autonomous vehicles 104 can have multiple modes, including, for example, a driver-operated mode, a partially autonomous control mode, and a fully autonomous control mode. In some embodiments, the autonomous vehicles 104 can operate as Level 3 or Level 4 vehicles as defined by the National Highway Traffic Safety Administration ("NHTSA"). The NHTSA defines a Level 3 vehicle as a limited self-driving automation vehicle that enables a driver to cede full control of all safety-critical functions under certain traffic or environmental conditions and in those conditions to rely heavily on the autonomous vehicle 104 to monitor for changes in those conditions requiring transition back to driver control. The driver is expected to be available for occasional control, but with sufficiently comfortable transition time. The NHTSA defines a Level 4 vehicle as a full self-driving automation vehicle that is designed to perform all safety-critical driving functions and monitor roadway conditions for an entire trip to a destination. Such a design anticipates that the driver will provide destination or navigation input, but is not expected to be available for control at any time during the trip. It should be understood that the concepts and technologies disclosed herein are applicable to existing autonomous vehicle technologies and are readily adaptable to future autonomous vehicle technologies.

The manufacturer, vehicle type (e.g., car, truck, van, etc.), and/or vehicle specification, including, but not limited to, occupant capacity, gross vehicle weight, towing capacity, engine type (e.g., internal combustion, electric, or hybrid), engine size, drive type (e.g., front wheel drive, rear wheel drive, all-wheel drive, or four wheel drive), and transmission type (e.g., manual, automatic, dual clutch, continuously variable, etc.) of the autonomous vehicles 104 should not be limited in any way. The concepts and technologies disclosed herein are applicable to all autonomous vehicles 104 that have, at a minimum, a ground-based operational mode. Moreover, human-powered vehicles such as bicycles, scooters, and the like are also contemplated, although those skilled in the art will appreciate that some aspects of the concepts and technologies disclosed herein may not be applicable to these vehicle types.

Each of the users 106 can be associated with one or more user devices 108. According to various embodiments, the functionality of the user devices 108 may be provided, at least in part, by one or more mobile telephones, smartphones, tablet computers, slate computers, smart watches, fitness devices, smart glasses, other wearable devices, mobile media playback devices, set top devices, navigation devices, laptop computers, notebook computers, ultrabook computers, netbook computers, server computers, computers of other form factors, computing devices of other form factors, other computing systems, other computing devices, Internet of Things ("IoT") devices, other unmanaged devices, other managed devices, and/or the like. It should be understood that the functionality of the user devices 108 can be provided by a single device, by two or more similar devices, and/or by two or more dissimilar devices.

The user devices 108 can be configured to communicate with one or more of the autonomous vehicles 104 via a wired connection, a wireless connection, or both. In some embodiments, the user devices 108 can communicate with the autonomous vehicles 104 via a short-range communication technology such as BLUETOOTH. Other wireless technologies such as Wi-Fi are also contemplated. Wired connections may be facilitated by a universal serial bus ("USB")-based connection, although other wired connection types, including proprietary connection types are also contemplated. Moreover, the user devices 108 may communicate directly or via some other interface with the autonomous vehicles 104 through one or more vehicle systems 110.

The illustrated autonomous vehicle$_1$ 104A is associated with the vehicle system(s)$_1$ 110A. The illustrated autonomous vehicle$_2$ 104B is associated with the vehicle system(s)$_2$ 110B. The illustrated autonomous vehicle$_N$ 104N can be associated with the vehicle system(s)$_N$ 110N. The vehicle system(s) 110 can include one or more systems associated with any aspect of the autonomous vehicle 104. For example, the vehicle systems 110 can include the engine, fuel system, ignition system, electrical system, exhaust system, drivetrain system, suspension system, steering system, braking system, parking assistance system (e.g., parking sensors), navigation system, radio system, infotainment system, communication system (e.g., in-car WI-FI and/or cellular connectivity), BLUETOOTH and/or other connectivity systems that allow connectivity with other systems, devices, and/or networks disclosed herein, driver assistance system (e.g., lane departure warning, lane keep assist, blind spot monitoring, parking assist, cruise control, automated cruise control, autonomous mode, semi-autonomous mode, and the like), tire pressure monitoring systems, combinations thereof, and the like. In some embodiments, the user devices 108 can be integrated (permanently or temporarily) with the autonomous vehicles 104 such as part of the vehicle system(s) 110. The user devices 108 may be retrofitted into the autonomous vehicles 104 as aftermarket equipment or may be made available as standard or optional original equipment manufacturer ("OEM") equipment of the autonomous vehicle 104. The vehicle system(s) 110 can utilize output from one or more vehicle sensors 112 to perform various operations, including self-driving operations, for example.

The illustrated autonomous vehicle$_1$ 104A is associated with the vehicle sensor(s)$_1$ 112A. The illustrated autonomous vehicle$_2$ 104B is associated with the vehicle sensor(s)$_2$ 112B. The illustrated autonomous vehicle$_N$ 104N is associated with the vehicle sensors(s)$_N$ 112N. The vehicle sensors 112 can provide output to one or more sensor controllers (e.g., operating as part of the vehicle system(s) 110) that can utilize the output to perform various vehicle operations. Modern vehicles have numerous systems that are controlled, at least in part, based upon the output of multiple sensors, including, for example, sensors associated with the operation of various vehicle components such as the drivetrain (e.g., engine, transmission, and differential), brakes, suspension, steering, and safety components. The concepts and technologies disclosed herein can utilize any of the vehicle sensors 112. It should be understood, however, that aspects of the concepts and technologies disclosed herein may rely on the output from sensors such as cameras, proximity sensors, radar sensors, and light detection and ranging ("LiDAR") sensors that aid in providing the autonomous vehicle 104 with information about the environment surrounding the autonomous vehicle 104, other vehicles (not shown), and pedestrians (also not shown). Those skilled in the art will appreciate the use of these and/or other similar sensors to enable the autonomous vehicles 104 to detect and classify objects in the environment (e.g., distinguish between roadside objects, other vehicles, and pedestrians), and to perform self-driving operations (e.g., accelerate, decelerate, brake, change lanes, obey traffic signs and signals, and avoid collisions and accidents).

In the illustrated example, the autonomous vehicle$_1$ 104A can include a V2X communications interface$_1$ 114A that enables the autonomous vehicle$_1$ 104A to communicate with one or more other entities, such as the autonomous vehicles$_{2-N}$ 104B-104N, other vehicles (not shown), a V2C platform 116, and a V2I platform 118, as will be described in greater detail below. The autonomous vehicles$_{2-N}$ 104B-104N can include V2X communications interfaces 114B-114N. The V2X communications interfaces 114 can be or can include a cellular interface, a WLAN interface, a short-range communications interface, or a combination thereof. In some embodiments, the V2X communications interfaces 114 are based upon a standard specification such as IEEE 802.11p (i.e., for WLAN-based V2X technology) or 3GPP C-V2X (i.e., for cellular-based V2X technology). It should be understood that as of the filing date of this patent application, V2X technology is in its infancy and the technology has not yet been widely adopted. Organizations, such as the 5G Automotive Association ("5GGA"), exist to promote the use of V2X technology. Accordingly, those skilled in the art will appreciate that the V2X communications interfaces 114 can be embodied in accordance with existing standards, but will likely change over time as V2X technology matures. The V2X communications interface 114 should be construed as being compatible with both current and future V2X standards. Moreover, proprietary technologies that enable V2X-type communication are also contemplated.

The V2X communications interfaces 114 of the autonomous vehicles$_{1-N}$ 104A-104N can communicate with the V2C platform 116 and the V2I platform 118 via one or more networks 120. The network(s) 120 can be or can include one or more mobile telecommunications networks (e.g., wireless wide area network(s) "WWANs") operated by one or more mobile network operators. The WWANs may, in turn, include one or more core networks such as a circuit-switched core network ("CS CN"), a packet-switched core network ("PS CN"), an IP multimedia subsystem ("IMS") core network, multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies (e.g., 802.11 WI-FI), and the like. The networks 120 can include one or more radio access networks ("RANs"). A RAN can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the V2X communications interfaces 114. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like. Those skilled in the art will appreciate the use of colloquial terms such as 1G, 2G, 3G, 4G, and 5G to describe different generations of the aforementioned technologies. An example configuration of the network 120 is illustrated and described herein with reference to FIG. 7.

The autonomous vehicle$_1$ 104A can utilize a vehicle V2I application$_1$ 122A and a V2C application$_1$ 124A to communicate with the V2C platform 116 and the V2I platform 118, respectively. Similarly, the autonomous vehicles$_{2-N}$ 104B-104N can utilize vehicle V2I applications$_{2-N}$ 122B-122N and V2C applications$_{2-N}$ 124B-124N to communicate with the V2C platform 116 and the V2I platform 118, respectively. Although separate V2I and V2C applications 122, 124 are shown, the functionality of these applications may be combined in a single V2X application (not shown).

The V2C platform 116 can provide, to the autonomous vehicles 104, one or more V2C services 126 via one or more V2C cloud networks 128. Although the V2C platform 116 is described specifically as "vehicle-to-cloud," the V2C platform 116 may alternatively be referred to as a "vehicle-to-network" platform to embody connectivity between the autonomous vehicles 104 and other non-cloud network types. The V2C services 126 can be or can include services, such as, but not limited to, navigation services, emergency services, concierge services, information services, entertainment services, or any combination thereof served via the V2C cloud network(s) 128. Other connected car services are contemplated as the breadth of connected car capabilities are expected to mature in the future. In some embodiments, at least part of the V2C platform 116 can be hosted on a cloud computing platform (best shown in FIG. 8) including cloud resources such as compute, memory/storage, and other resources.

The V2I platform 118 can provide one or more V2I services 130 that utilize one or more V2I devices 132, such as lane marking devices and roadside devices (e.g., signs and traffic lights), to communicate with the autonomous vehicles 104. For example, the V2I services 130 can capture, from the autonomous vehicles 104, data such as the speed and other metrics. These metrics can be used as part of traffic data collection. The V2I services 130 also can provide data to the autonomous vehicles 104 to inform the vehicle occupant(s) (e.g., the user(s) 106) of safety information, accident information, mobility information, weather information, other environment-related condition information, and/or other information. In some embodiments, at least part of the V2I platform 118 can be hosted on a cloud computing platform (best shown in FIG. 8) including cloud resources such as compute, memory/storage, and other resources.

Each of the autonomous vehicles$_{1-N}$ 104A-104N can execute, via one or more processors, a fleet pairing management application ("FPMA")$_{1-N}$ 134A-134N (hereafter referred to collectively as "FPMAs 134" or individually as "FPMA 134"), respectively. The FPMAs 134 enable the autonomous vehicles 104 to be paired together to form the autonomous vehicle fleet 102 either via direct V2V communication or communication via the network(s) 120. The autonomous vehicle fleet 102 may contain autonomous vehicles 104 of different makes, models, and/or trims. As a result, the concepts and technologies disclosed herein can be vehicle agnostic. This offers several benefits over proprietary technologies that work only with specific makes, models, and/or trims. It should be understood, however, that the autonomous vehicles and the other autonomous vehicles may be the same or similar makes, models, and/or trims.

The autonomous vehicles 104 can download the FPMAs$_{1-N}$ 134A-134N from an FPMA server 136. In the illustrated example, the FPMA server 136 includes an FPMA data store 138 that can store one or more FPMA application packages 140 and one or more FPMA application updates 142. The FPMA application packages 140 can include the FPMA 134. The FPMA application packages 140 can additionally include one or more supporting applications, drivers, other software, other firmware, and/or the like that the autonomous vehicles 104 should have installed to fully utilize the FPMAs 134. Supporting applications, drivers, other software, other firmware, and/or the like can be provided separate from the FPMA application packages 140 that include only the FPMA 134. The FPMA application packages 140 may be generic to the autonomous vehicles 104. Alternatively, the FMPA application packages 140 may be specific to a particular make and/or model or may contain the FPMAs 134 for multiple makes and/or models. The FPMA application updates 142 can be pushed to the autonomous vehicles 104 as needed to ensure the FPMAs 134 are up-to-date.

In some embodiments, the FPMA server 136 is a service provider backend server. The service provider may be a telecommunications service provider that provides, at least in part, one or more telecommunications services via the network(s) 120. The service provider may be an emergency service provider, such as law enforcement, fire fighter, ambulance, emergency medical services ("EMS"), and/or other emergency services. The service provider may be a transportation service provider such as a taxi service. The service provider may be a delivery service provider, such as retail goods delivery service, grocery delivery service, restaurant delivery service, and/or the like. The service provider may be other types of service providers, including retail service, e-commerce service, and/or the like. The service provider may be a trucking transport company. The concepts and technologies disclosed herein are not limited to the above examples, and as such, these examples should not be construed as being limiting in any way.

The FPMA server 136 also can include an FPMA centralized coordination module 144. The FPMA centralized coordination module 144 can provide to the autonomous vehicles 104, and particularly, the FPMAs 134 coordination instructions to aid the FPMAs 134 in coordinating operation of the autonomous vehicles 104 as part of the autonomous vehicle fleet 102. For embodiments in which the FMPA server 136 is an emergency service provider, the FPMA centralized coordination module 144 can be part of a dispatch facility (e.g., 9-1-1 dispatch facility) and be executed by one or more computers of the dispatch facility. Alternatively, the FPMA server 136 itself, including the FPMA centralized coordination module 144, may be part of the dispatch facility. Other configurations are possible and are contemplated. As such, the configurations disclosed herein should not be construed as being limiting in any way.

Figure 2A:
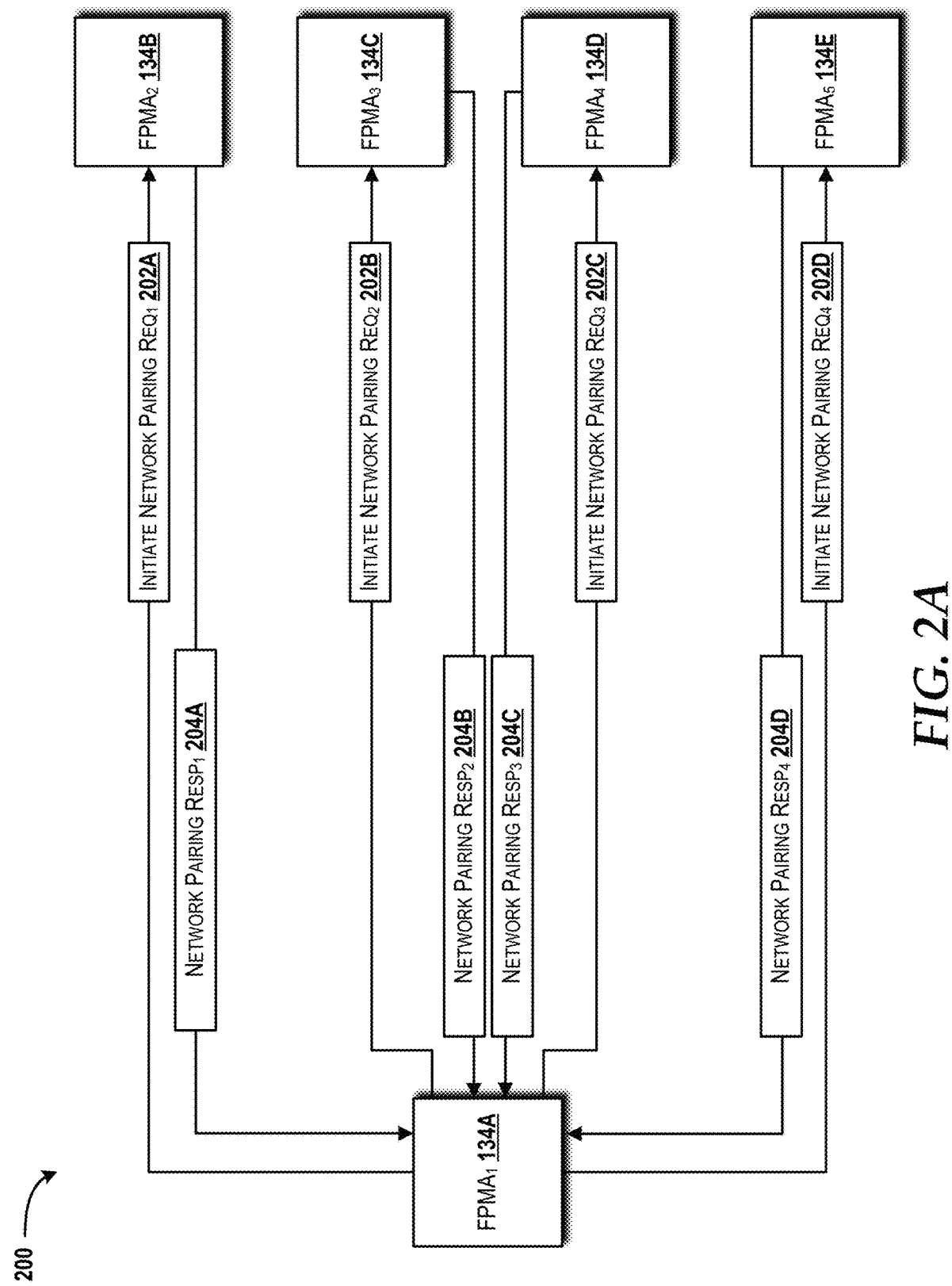
FIG. 2A is a block diagram illustrating an example pairing process, according to an illustrative embodiment of the concepts and technologies disclosed herein.

Turning now to FIG. 2A, a block diagram illustrating an example pairing process (shown generally as 200) will be described, according to an illustrative embodiment of the concepts and technologies disclosed herein. In the illustrated embodiment, the $FPMA_1$ 134A generates and sends initiate network pairing $requests_{1-4}$ 202A-202D to the $FPMAs_{2-5}$ 134B-134E, respectively. In some embodiments, the $FPMA_1$ 134A sends the initiate network pairing $requests_{1-4}$ 202A-202D to the $FPMAs_{2-5}$ 134B-134E over the network(s) 120. In other embodiments, the $FPMA_1$ 134A can send the initiate network pairing $requests_{1-4}$ 202A-202D directly to the $FPMAs_{2-5}$ 134B-134E via V2V communications. The initiate network pairing $requests_{1-4}$ 202A-202D can include one or more security credentials such as username, password, PIN, or the like. In response, each of the $FPMAs_{2-5}$ 134B-134E can respond with a network pairing $response_{1-4}$ 204A-204D, respectively. Each of the network pairing $responses_{1-4}$ 204A-204D can confirm or deny pairing for the associated FPMA. The network pairing $responses_{1-4}$ 204A-204D also can include one or more security credentials such as username, password, PIN, or the like. Multi-factor authentication can be enabled through other devices such as the user devices 108.

Figure 2B:
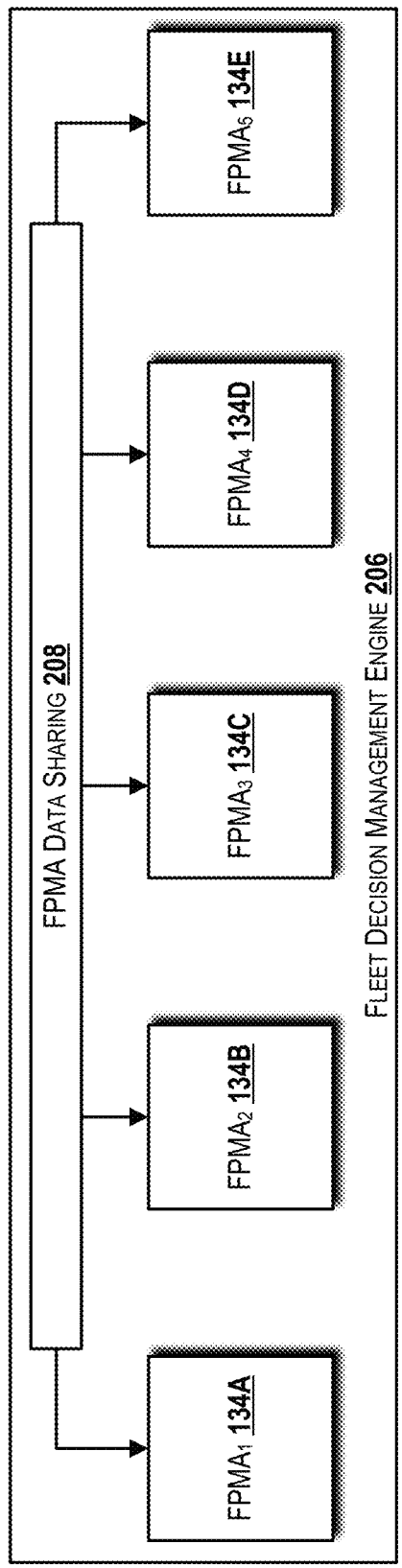
FIG. 2B is a block diagram illustrating an example fleet decision management engine including a plurality of paired fleet pairing management applications ("FPMAs"), according to an illustrative embodiment of the concepts and technologies disclosed herein.

Turning now to FIG. 2B, a block diagram illustrating an example fleet decision management engine 206 will be described, according to an illustrative embodiment of the concepts and technologies disclosed herein. After the autonomous vehicles 104 are paired, the $FPMAs_{1-5}$ 134A-134E can communicate as part of the fleet decision management engine 206, which enables distributed management of the operation of the fleet of autonomous vehicles 104. The illustrated fleet decision management engine 206 includes the $FPMAs_{1-5}$ 134A-134E associated with the autonomous vehicles 104 that form the fleet 102. The $FMPAs_{1-5}$ 134A-134E can then perform FPMA data sharing 208 as needed. The data can include vehicle data associated with the vehicle system(s) 110 and/or the vehicle sensor(s) 112. The data also can include map data. The map data can include latitude and longitude location data, street data, topology data, navigation data, and the like.

Figure 3:
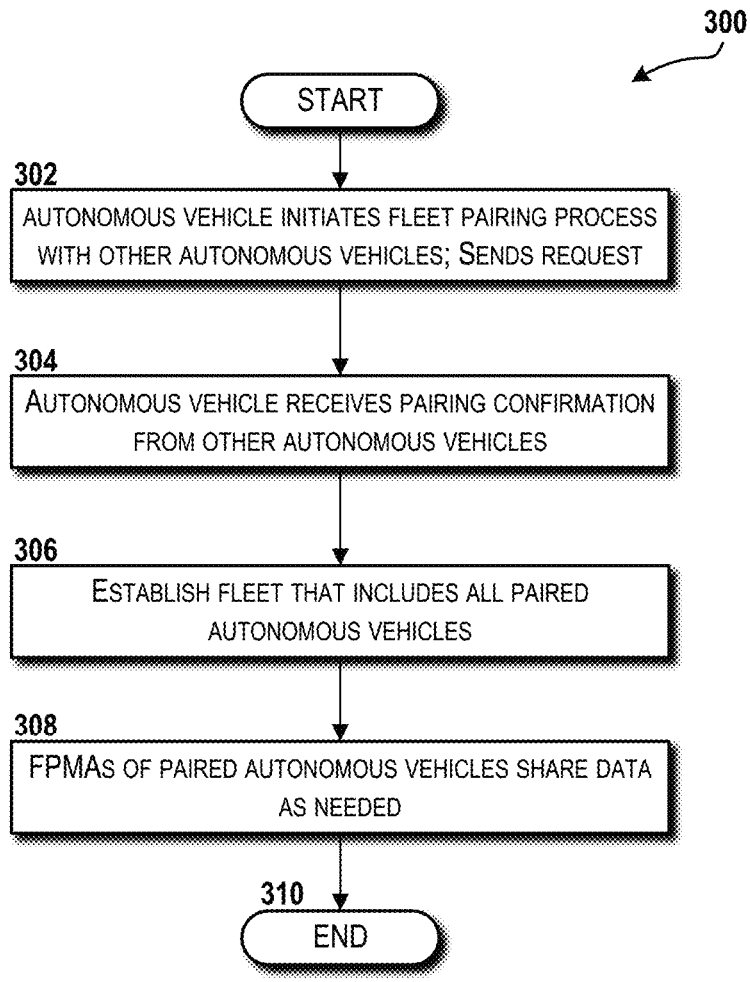
FIG. 3 is a flow diagram illustrating aspects of a method for pairing autonomous vehicles, according to an illustrative embodiment of the concepts and technologies disclosed herein.

Turning now to FIG. 3, a flow diagram illustrating aspects of a method 300 for pairing autonomous vehicles 104 will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described from the perspective of the autonomous $vehicle_1$ 104A with additional reference to FIGS. 1 and 2A. It should be understood, however, that any of the autonomous vehicles 104 can perform the operations of the method 300. As such, the illustrated method 300 should not be construed as being limiting in any way.

The method 300 begins and proceeds to operation 302. At operation 302, the autonomous $vehicle_1$ 104A, via the $FPMA_1$ 134A, initiates a fleet pairing process with the other autonomous $vehicles_{2-5}$ 104B-104E. Also at operation 302, the autonomous $vehicle_1$ 104A, via the $FPMA_1$ 134A, sends the initiate network pairing requests 202A-202D to the $FPMAs_{2-5}$ 134B-134E associated with the other autonomous $vehicles_{2-5}$ 104B-104E.

From operation 302, the method 300 proceeds to operation 304. At operation 304, the autonomous $vehicle_1$ 134A, via the $FMPA_1$ 124A, receives the pairing confirmation from the other autonomous $vehicles_{2-5}$ 104B-104E. From operation 304, the method 300 proceeds to operation 306. At operation 306, the fleet of autonomous vehicles 102 is established. From operation 306, the method 300 proceeds to operation 308. At operation 308, the FPMAs 134 of the paired autonomous vehicles 104 share data as needed.

From operation 308, the method 300 proceeds to operation 310. At operation 310, the method 300 can end.

Figure 4:
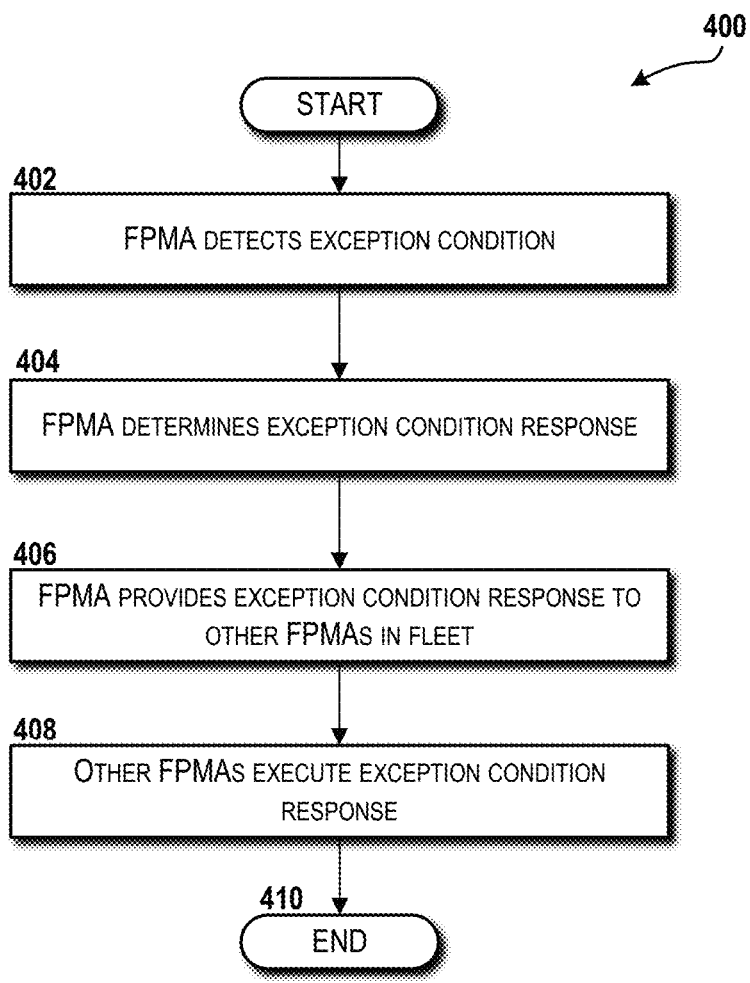
FIG. 4 is a flow diagram illustrating aspects of a method for handling exception conditions within a fleet of exception conditions, according to an illustrative embodiment of the concepts and technologies disclosed herein.

Turning now to FIG. 4, a method 400 for handling exception conditions within a fleet of autonomous vehicles 102 will be described, according to an illustrative embodiment of the concepts and technologies disclosed herein. The method 400 will be described from the perspective of the autonomous $vehicle_1$ 104A with additional reference to FIGS. 1 and 2A. It should be understood, however, that any of the autonomous vehicles 104 can perform the operations of the method 400. As such, the illustrated method 400 should not be construed as being limiting in any way.

The method 400 begins and proceeds to operation 402. At operation 402, the $FPMA_1$ 134A detects an exception condition. The exception condition can be derived from data shared among the fleet 102. For example, the data can include vehicle data associated with one or more of the vehicle systems$_1$ 110A, one or more of the vehicle sensors$_1$ 112A, or both the vehicle system(s)$_1$ 110A and the vehicle sensor(s)$_1$ 112A for each of the autonomous vehicles 104. The data also can include map data that can include latitude and longitude location data, street data, topology data, navigation data, and the like. The exception condition can be any condition that is outside a given set of parameters. The set of parameters can include vehicle parameters such as speed, location, direction of travel, energy capacity (e.g., fuel capacity or battery capacity remaining), and/or other parameters associated with the operation of the autonomous vehicles 104.

From operation 402, the method 400 proceeds to operation 404. At operation 404, the FPMA$_1$ 134A determines an exception condition response. The exception condition response can be used by the FPMA$_1$ 134A to instruct the other FPMAs$_{2-5}$ 134B-134E in the fleet 102 to perform one or more actions to mitigate the effect(s) of the exception condition. For example, if the exception condition relates to a low fuel warning of the autonomous vehicle$_1$ 104A, the FPMA$_1$ 134A associated with the autonomous vehicle$_1$ 104A can determine a nearby fueling station, calculate the time needed to acquire fuel sufficient to at least arrive at the target location, and instruct the other autonomous vehicles$_{2-5}$ 104B-104E to also plan a fueling stop to maximize efficiency of downtime by the autonomous vehicle$_1$ 104A. Alternatively, the exception condition response can instruct the other autonomous vehicles$_{2-5}$ 104B-104E to change speed, select an alternate route, make a scheduled stop, enter a holding pattern (e.g., repeat a section of pre-determined route instructions), or any other way in which the other autonomous vehicles$_{2-5}$ 104B-104E can mitigate, at least in part, the effect(s) of the exception condition.

From operation 404, the method 400 proceeds to operation 406. At operation 406, the FPMA$_1$ 134A provides the exception condition response to the other FPMAs$_{2-5}$ 134B-134E in the fleet 102. The FPMA$_1$ 134A can provide the exception condition response directly via vehicle-to-vehicle and/or via the network(s) 120. From operation 406, the method 400 proceeds to operation 408. At operation 408, the other FPMAs$_{2-5}$ 134B-134E can execute the exception condition response to mitigate, at least in part, the effect(s) of the exception condition.

From operation 408, the method 400 proceeds to operation 410. The method 400 can end at operation 410.

Figure 5:
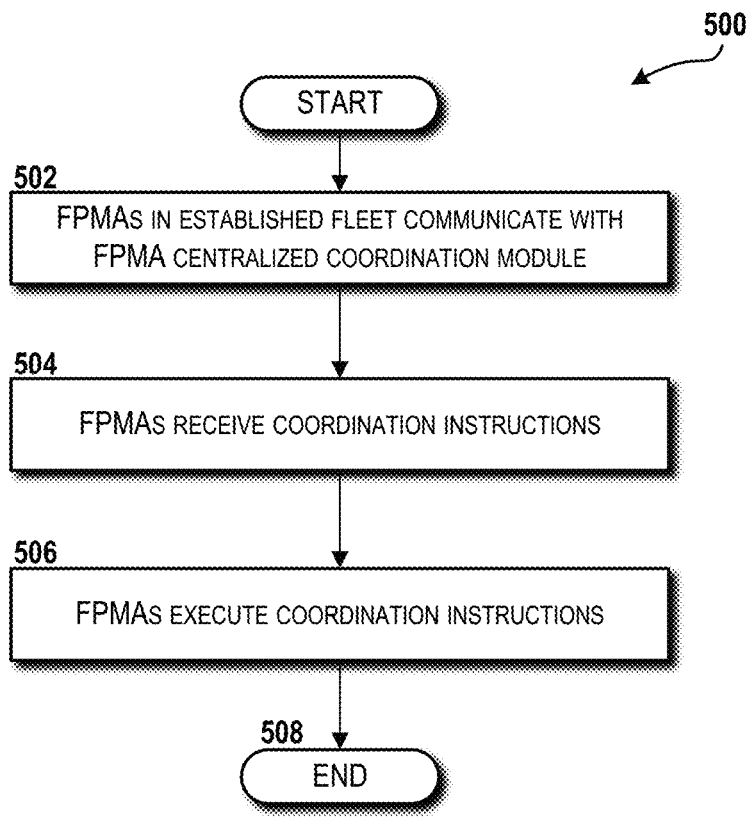
FIG. 5 is a flow diagram illustrating aspects of a method for coordinating a fleet of autonomous vehicles, according to an illustrative embodiment of the concepts and technologies disclosed herein.

Turning now to FIG. 5, a method 500 for externally coordinating the autonomous vehicle fleet 102 will be described, according to an illustrative embodiment of the concepts and technologies disclosed herein. The method 500 begins and proceeds to operation 502. At operation 502, the FPMAs 134 in an established fleet of autonomous vehicles (e.g., the autonomous vehicle fleet 102 shown in FIG. 1) communicate with the FPMA centralized coordination module 144. This communication may be initiated by the FPMA centralized coordination module 144, such as part of an emergency dispatch. Alternatively, one or more of the FPMAs 134 may initiate this communication towards the FPMA centralized coordination module 144.

From operation 502, the method 500 proceeds to operation 504. At operation 504, the FPMAs 134 can receive coordination instructions from the FPMA centralized coordination module 144. The coordination instructions can instruct each individual FPMA 134 to navigate to a specific location in coordination with the other FPMAs 134 such that the autonomous vehicles 104 operate simultaneously as part of the autonomous vehicle fleet 102. For example, each of the autonomous vehicles 104 may be instructed to take the same route or different routes to ensure arrival at the specific location by a specific time or within a specific time frame. This also may entail instructing the autonomous vehicles 104 to operate at the same or different speeds. The coordination instructions also may take into consideration one or more stops, such as gasoline refills, electric vehicle charging, and/or other maintenance stops. In some embodiments, the coordination instructions are provided as part of a continually updating process such that real-time behavior of the autonomous vehicles 104, traffic, weather, and/or other situational circumstances may be considered by the FPMA centralized coordination module 144. From operation 504, the method 500 can proceed to operation 506. At operation 506, the FPMAs 134 can execute the coordination instructions.

From operation 506, the method 500 can proceed to operation 508. The method 500 can end at operation 508.

Figure 6:
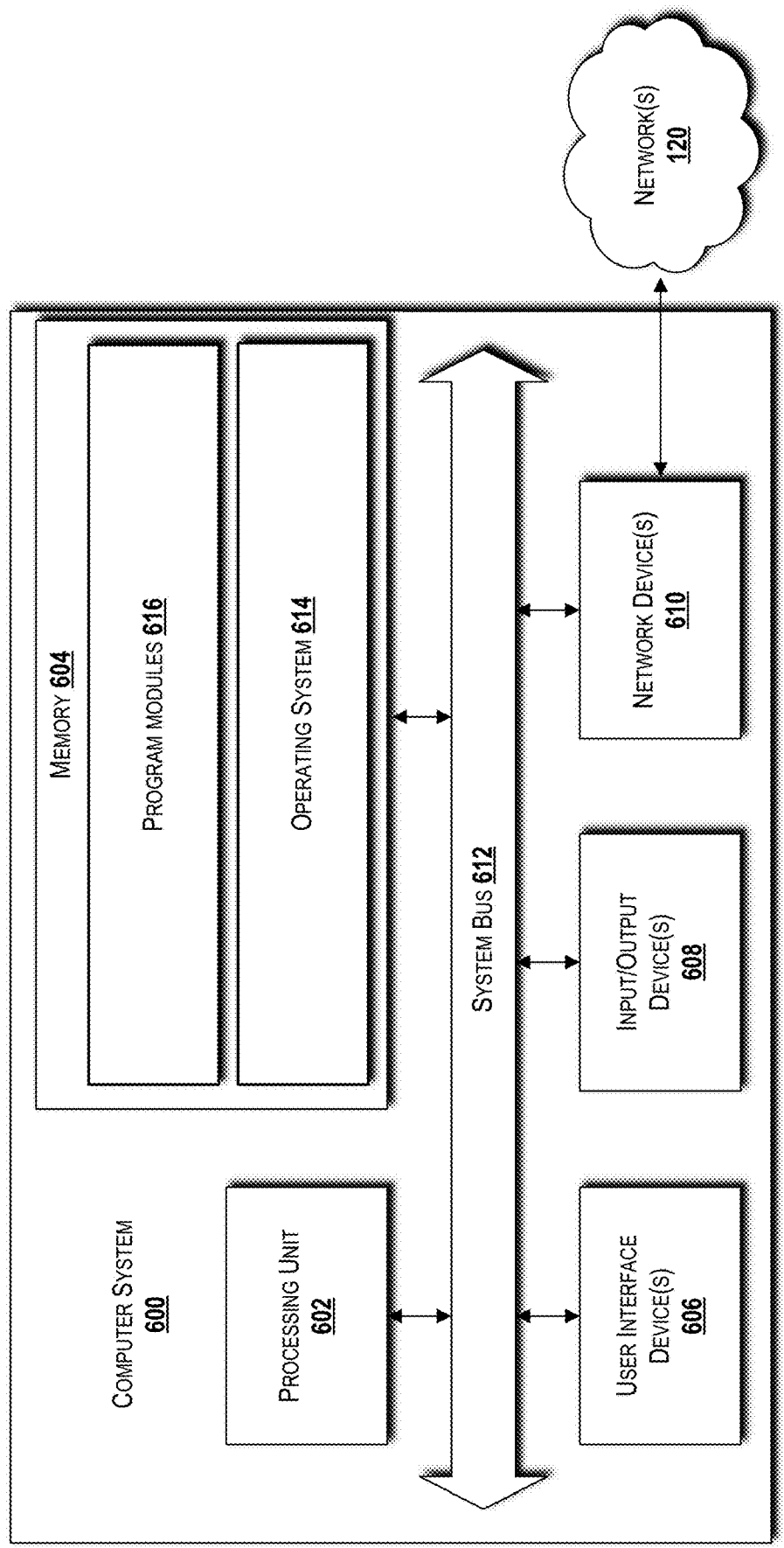
FIG. 6 is a diagram illustrating an illustrative computer system capable of implementing aspects of the concepts and technologies disclosed herein

Turning now to FIG. 6, a block diagram illustrating a computer system 600 configured to provide the functionality described herein in accordance with various embodiments of the concepts and technologies disclosed herein will be described. In some embodiments, the vehicle system(s) 110, the V2C platform 116, the V2I platform 118, the V2I device(s) 132, the user device(s) 108, the FMPA server 136, one or more components thereof, and/or other systems/platforms/devices/elements disclosed herein can be configured like and/or can have an architecture similar or identical to the computer system 600 described herein with respect to FIG. 6. It should be understood, however, that any of these systems, devices, platforms, or elements may or may not include the functionality described herein with reference to FIG. 6.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 616 can include various software, program modules, and/or data described herein. For example, the program modules 616 can include the vehicle V2I application 122, the vehicle V2C application 124, the FPMA 134, the V2C services 126, the V2I services 130, and/or the FPMA centralized coordination module 144. The memory 604 also can be or can include the FPMA data store 138 that includes the FPMA application package(s) 140 and the FPMA application update(s) 142. The memory 604 also can store other data described herein.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium," "computer-readable storage medium," and variations thereof does not include waves or signals per se and/or communication media, and therefore should be construed as being directed to "non-transitory" media only.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer to output data.

The network devices 610 enable the computer system 600 to communicate with other networks or remote systems via one or more networks, such as the network(s) 120 (best shown in FIG. 1). Examples of the network devices 610 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a Wireless Metropolitan Area Network ("WMAN") such as a Worldwide Interoperability for Microwave Access ("WiMAX") network, or a cellular network. Alternatively, the network(s) may be a wired network such as, but not limited to, a WAN such as the Internet, a LAN, a wired PAN, or a wired MAN.

Figure 7:
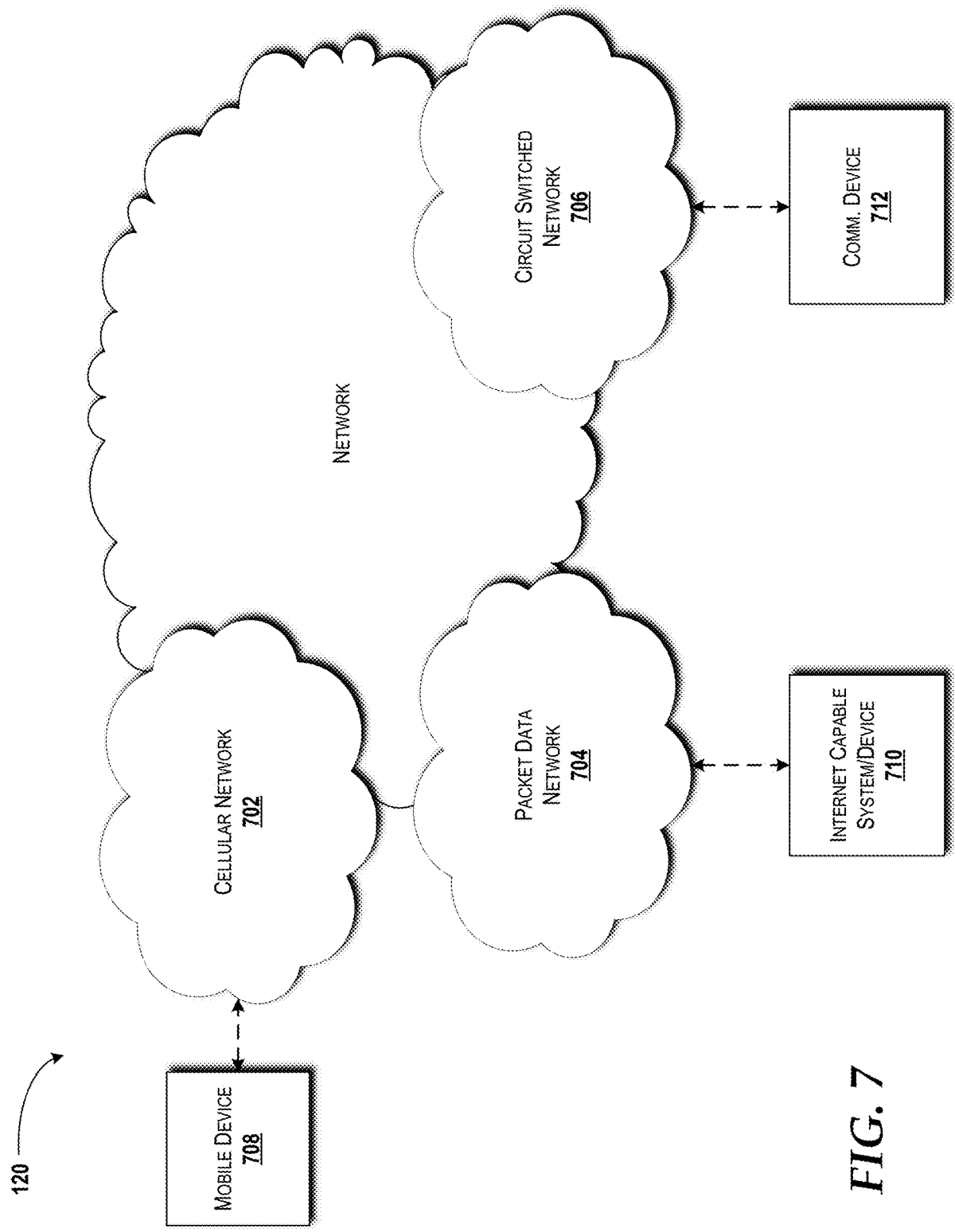
FIG. 7 is a diagram illustrating an illustrative network capable of implementing aspects of the concepts and technologies disclosed herein.

Turning now to FIG. 7, additional details of an embodiment of the network 120 will be described, according to an illustrative embodiment. In the illustrated embodiment, the network 120 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), HSSs, visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the user device(s) 108, a cellular telephone, a user equipment, a mobile terminal, a PDA, a laptop computer, a handheld computer, and combinations thereof, can be operatively connected to the cellular network 702. The cellular network 702 can be configured to utilize any using any wireless communications technology or combination of wireless communications technologies, some examples of which include, but are not limited to, GSM, CDMA ONE, CDMA2000, UMTS, LTE, WiMAX), other IEEE 802.XX technologies, mmWave, and the like. The mobile communications device 708 can communicate with the cellular network 702 via various channel access methods (which may or may not be used by the aforementioned technologies), including, but not limited to, TDMA, FDMA, CDMA, W-CDMA, OFDM, SC-FDMA, SDMA, and the like. Data can be exchanged between the mobile communications device 708 and the cellular network 702 via cellular data technologies such as, but not limited to, GPRS, EDGE, the HSPA protocol family including HSDPA, EUL or otherwise termed HSDPA, HSPA+, LTE, 5G technologies, and/or various other current and future wireless data access technologies. It should be understood that the cellular network 702 may additionally include backbone infrastructure that operates on wired communications technologies, including, but not limited to, optical fiber, coaxial cable, twisted pair cable, and the like to transfer data between various systems operating on or in communication with the cellular network 702.

The packet data network 704 can include various systems/platforms/devices, for example, the V2C platform 116, the V2I platform 118, the FPMA server 136, servers, computers, databases, and other systems/platforms/devices, in communication with one another. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet.

The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable systems/devices 710, for example, the V2C platform 116, the V2I platform 118, the FPMA server 136, a personal computer ("PC"), a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. It should be appreciated that substantially all of the functionality described with reference to the network 120 can be performed by the cellular network 702, the packet data network 704, and/or the circuit switched network 706, alone or in combination with additional and/or alternative networks, network elements, and the like.

Figure 8:
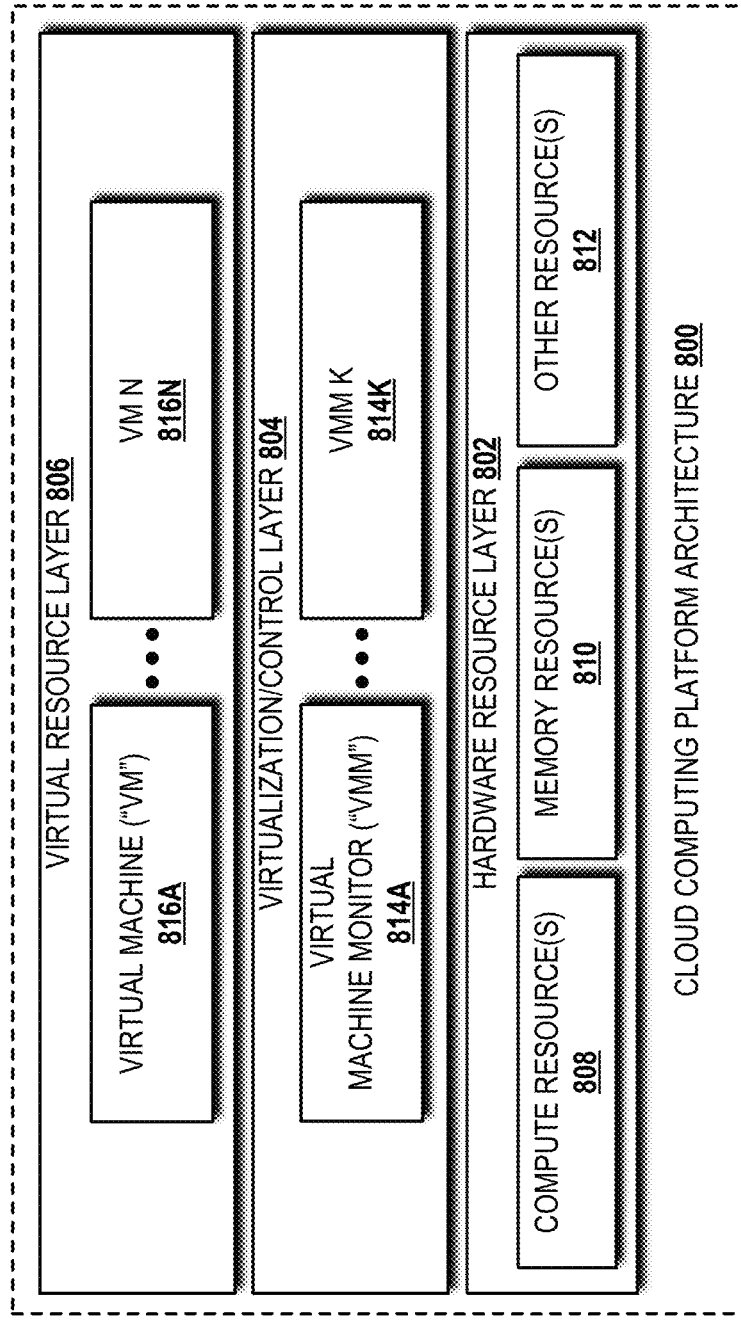
FIG. 8 is a diagram illustrating an illustrative cloud computing platform capable of implementing aspects of the concepts and technologies disclosed herein.

Turning now to FIG. 8, a cloud computing platform architecture 800 capable of implementing aspects of the concepts and technologies disclosed herein will be described, according to an illustrative embodiment. In some embodiments, the V2C platform 116 and/or the FPMA server 136 can be implemented, at least in part, on the cloud computing platform architecture 800. Those skilled in the art will appreciate that the illustrated cloud computing platform architecture 800 is a simplification of but one possible implementation of an illustrative cloud computing platform, and as such, the cloud computing platform architecture 800 should not be construed as limiting in any way.

The illustrated cloud computing platform architecture 800 includes a hardware resource layer 802, a virtualization/control layer 804, and a virtual resource layer 806 that work together to perform operations as will be described in detail herein. While connections are shown between some of the components illustrated in FIG. 8, it should be understood that some, none, or all of the components illustrated in FIG. 8 can be configured to interact with one other to carry out various functions described herein. In some embodiments, the components are arranged so as to communicate via one or more networks (not shown). Thus, it should be understood that FIG. 8 and the following description are intended to provide a general understanding of a suitable environment in which various aspects of embodiments can be implemented, and should not be construed as being limiting in any way.

The hardware resource layer 802 provides hardware resources, which, in the illustrated embodiment, include one or more compute resources 808, one or more memory resources 810, and one or more other resources 812. The compute resource(s) 806 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, California, and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 806 and/or the memory resource(s) 810 to perform operations. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 814A-814K (also known as "hypervisors," hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Figure 9:
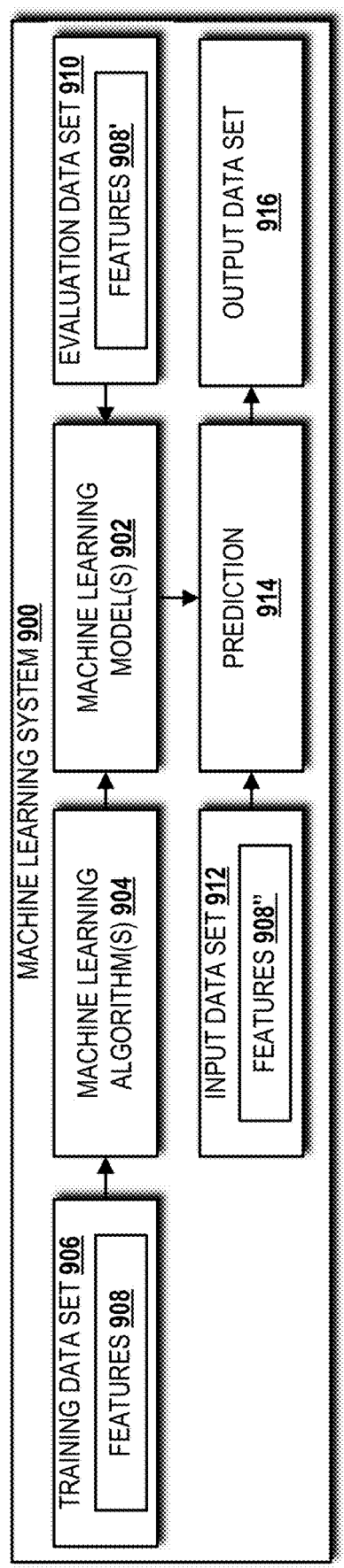
FIG. 9 is a diagram illustrating an illustrative machine learning system capable of implementing aspects of the concepts and technologies disclosed herein.

Turning now to FIG. 9, a machine learning system 900 capable of implementing aspects of the embodiments disclosed herein will be described. In some embodiments, the FPMAs 134 can be configured to utilize machine learning functionality to perform operations described herein. In some embodiments, the FPMA server 136, and particularly, the FPMA centralized coordination module 144 can be configured to utilize machine learning functionality to perform operations described herein.

The illustrated machine learning system 900 includes one or more machine learning models 902. The machine learning models 902 can include supervised and/or semi-supervised learning models. The machine learning model(s) 902 can be created by the machine learning system 900 based upon one or more machine learning algorithms 904. The machine learning algorithm(s) 904 can be any existing, well-known algorithm, any proprietary algorithms, or any future machine learning algorithm. Some example machine learning algorithms 904 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 904 based upon the problem(s) to be solved by machine learning via the machine learning system 900.

The machine learning system 900 can control the creation of the machine learning models 902 via one or more training parameters. In some embodiments, the training parameters are selected modelers at the direction of an enterprise, for example. Alternatively, in some embodiments, the training parameters are automatically selected based upon data provided in one or more training data sets 906. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 904 converges to the optimal weights. The machine learning algorithm 904 can update the weights for every data example included in the training data set 906. The size of an update is controlled by the learning rate. A learning rate that is too high might prevent the machine learning algorithm 904 from converging to the optimal weights. A learning rate that is too low might result in the machine learning algorithm 904 requiring multiple training passes to converge to the optimal weights.

The model size is regulated by the number of input features ("features") 908 in the training data set 906. A greater the number of features 908 yields a greater number of possible patterns that can be determined from the training data set 906. The model size should be selected to balance the resources (e.g., compute, memory, storage, etc.) needed for training and the predictive power of the resultant machine learning model 902.

The number of training passes indicates the number of training passes that the machine learning algorithm 904 makes over the training data set 906 during the training process. The number of training passes can be adjusted based, for example, on the size of the training data set 906, with larger training data sets being exposed to fewer training passes in consideration of time and/or resource utilization. The effectiveness of the resultant machine learning model 902 can be increased by multiple training passes.

Data shuffling is a training parameter designed to prevent the machine learning algorithm 904 from reaching false optimal weights due to the order in which data contained in the training data set 906 is processed. For example, data provided in rows and columns might be analyzed first row, second row, third row, etc., and thus an optimal weight might be obtained well before a full range of data has been considered. By data shuffling, the data contained in the training data set 906 can be analyzed more thoroughly and mitigate bias in the resultant training machine learning model 902.

Regularization is a training parameter that helps to prevent the machine learning model 902 from memorizing training data from the training data set 906. In other words, the machine learning model 902 fits the training data set 906, but the predictive performance of the machine learning model 902 is not acceptable. Regularization helps the machine learning system 900 avoid this overfitting/memorization problem by adjusting extreme weight values of the features 908. For example, a feature that has a small weight value relative to the weight values of the other features in the training data set 906 can be adjusted to zero.

The machine learning system 900 can determine model accuracy after training by using one or more evaluation data sets 910 containing the same features 908' as the features 908 in the training data set 906. This also prevents the machine learning model 902 from simply memorizing the data contained in the training data set 906. The number of evaluation passes made by the machine learning system 900 can be regulated by a target model accuracy that, when reached, ends the evaluation process and the machine learning model 902 is considered ready for deployment.

After deployment, the machine learning model 902 can perform a prediction operation ("prediction") 914 with an input data set 912 having the same features 908" as the features 908 in the training data set 906 and the features 908' of the evaluation data set 910. The results of the prediction 914 are included in an output data set 916 consisting of predicted data. The machine learning model 902 can perform other operations, such as regression, classification, and others. As such, the example illustrated in FIG. 9 should not be construed as being limiting in any way.

Figure 10:
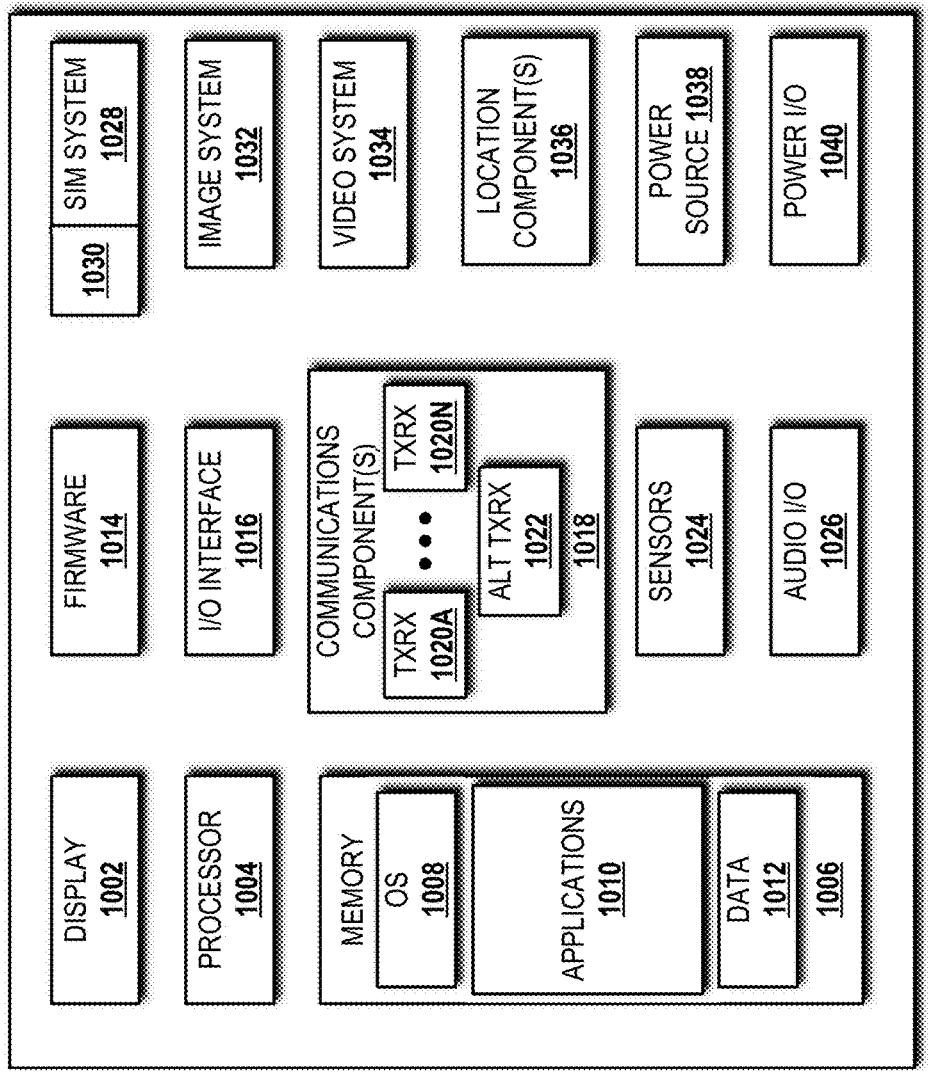
FIG. 10 is a block diagram illustrating an illustrative mobile device and components thereof capable of implementing aspects of the concepts and technologies disclosed herein.

Turning now to FIG. 10, an illustrative mobile device 1000 and components thereof will be described. In some embodiments, one or more of the vehicle systems 110 and/or the user devices 108 are configured similar to or the same as the mobile device 1000. While connections are not shown between the various components illustrated in FIG. 10, it should be understood that some, none, or all of the components illustrated in FIG. 10 can be configured to interact with one another to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

As illustrated in FIG. 10, the mobile device 1000 can include a display 1002 for displaying data. According to various embodiments, the display 1002 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 1000 also can include a processor 1004 and a memory or other data storage device ("memory") 1006. The processor 1004 can be configured to process data and/or can execute computer-executable instructions stored in the memory 1006. The computer-executable instructions executed by the processor 1004 can include, for example, an operating system 1008, one or more applications 1010 (e.g., the vehicle V2I application 122, the vehicle V2C application 124, and/or the FPMA 134), other computer-executable instructions stored in the memory 1006, or the like. In some embodiments, the applications 1010 also can include a UI application (not illustrated in FIG. 10).

The UI application can interface with the operating system 1008 to facilitate user interaction with functionality and/or data stored at the mobile device 1000 and/or stored elsewhere. In some embodiments, the operating system 1008 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1004 to aid a user in entering/deleting data, entering and setting user IDs and passwords for device access, configuring settings, manipulating content and/or settings, multimode interaction, interacting with other applications 1010, and otherwise facilitating user interaction with the operating system 1008, the applications 1010, and/or other types or instances of data 1012 that can be stored at the mobile device 1000.

The applications 1010, the data 1012, and/or portions thereof can be stored in the memory 1006 and/or in a firmware 1014, and can be executed by the processor 1004. The firmware 1014 also can store code for execution during device power up and power down operations. It can be appreciated that the firmware 1014 can be stored in a volatile or non-volatile data storage device including, but not limited to, the memory 1006 and/or a portion thereof.

The mobile device 1000 also can include an input/output ("I/O") interface 1016. The I/O interface 1016 can be configured to support the input/output of data such as location information, presence status information, user IDs, passwords, and application initiation (start-up) requests. In some embodiments, the I/O interface 1016 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1000 can be configured to synchronize with another device to transfer content to and/or from the mobile device 1000. In some embodiments, the mobile device 1000 can be configured to receive updates to one or more of the applications 1010 via the I/O interface 1016, though this is not necessarily the case. In some embodiments, the I/O interface 1016 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1016 may be used for communications between the mobile device 1000 and a network device or local device.

The mobile device 1000 also can include a communications component 1018. The communications component 1018 can be configured to interface with the processor 1004 to facilitate wired and/or wireless communications with one or more networks, such as the network 116, the Internet, or some combination thereof. In some embodiments, the communications component 1018 includes a multimode communications subsystem for facilitating communications via the cellular network and one or more other networks.

The communications component 1018, in some embodiments, includes one or more transceivers. The one or more transceivers, if included, can be configured to communicate over the same and/or different wireless technology standards with respect to one another. For example, in some embodiments, one or more of the transceivers of the communications component 1018 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 1018 may facilitate communications over various channel access methods (which may or may not be used by the aforementioned standards) including, but not limited to, Time-Division Multiple Access ("TDMA"), Frequency- Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 1018 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 1018 can include a first transceiver ("TxRx") 1020A that can operate in a first communications mode (e.g., GSM). The communications component 1018 also can include an Nth transceiver ("TxRx") 1020N that can operate in a second communications mode relative to the first transceiver 1020A (e.g., UMTS). While two transceivers 1020A-1020N (hereinafter collectively and/or generically referred to as "transceivers 1020") are shown in FIG. 10, it should be appreciated that less than two, two, and/or more than two transceivers 1020 can be included in the communications component 1018.

The communications component 1018 also can include an alternative transceiver ("Alt TxRx") 1022 for supporting other types and/or standards of communications. According to various contemplated embodiments, the alternative transceiver 1022 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1018 also can facilitate reception from terrestrial radio networks, digital satellite radio networks, internet-based radio service networks, combinations thereof, and the like. The communications component 1018 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1000 also can include one or more sensors 1024. The sensors 1024 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1000 may be provided by an audio I/O component 1026. The audio I/O component 1026 of the mobile device 1000 can include one or more speakers for the output of audio signals, one or more microphones for the collection and/or input of audio signals, and/or other audio input and/or output devices.

The illustrated mobile device 1000 also can include a subscriber identity module ("SIM") system 1028. The SIM system 1028 can include a universal SIM ("USIM"), a universal integrated circuit card ("UICC") and/or other identity devices. The SIM system 1028 can include and/or can be connected to or inserted into an interface such as a slot interface 1030. In some embodiments, the slot interface 1030 can be configured to accept insertion of other identity cards or modules for accessing various types of networks. Additionally, or alternatively, the slot interface 1030 can be configured to accept multiple subscriber identity cards. Because other devices and/or modules for identifying users and/or the mobile device 1000 are contemplated, it should be understood that these embodiments are illustrative, and should not be construed as being limiting in any way.

The mobile device 1000 also can include an image capture and processing system 1032 ("image system"). The image system 1032 can be configured to capture or otherwise obtain photos, videos, and/or other visual information. As such, the image system 1032 can include cameras, lenses, charge-coupled devices ("CCDs"), combinations thereof, or the like. The mobile device 1000 may also include a video system 1034. The video system 1034 can be configured to capture, process, record, modify, and/or store video content. Photos and videos obtained using the image system 1032 and the video system 1034, respectively, may be added as message content to an MMS message, email message, and sent to another device. The video and/or photo content also can be shared with other devices via various types of data transfers via wired and/or wireless communication devices as described herein.

The mobile device 1000 also can include one or more location components 1036. The location components 1036 can be configured to send and/or receive signals to determine a geographic location of the mobile device 1000. According to various embodiments, the location components 1036 can send and/or receive signals from global positioning system ("GPS") devices, assisted-GPS ("A-GPS") devices, WI-FI/WIMAX and/or cellular network triangulation data, combinations thereof, and the like. The location component 1036 also can be configured to communicate with the communications component 1018 to retrieve triangulation data for determining a location of the mobile device 1000. In some embodiments, the location component 1036 can interface with cellular network nodes, telephone lines, satellites, location transmitters and/or beacons, wireless network transmitters and receivers, combinations thereof, and the like. In some embodiments, the location component 1036 can include and/or can communicate with one or more of the sensors 1024 such as a compass, an accelerometer, and/or a gyroscope to determine the orientation of the mobile device 1000. Using the location component 1036, the mobile device 1000 can generate and/or receive data to identify its geographic location, or to transmit data used by other devices to determine the location of the mobile device 1000. The location component 1036 may include multiple components for determining the location and/or orientation of the mobile device 1000.

The illustrated mobile device 1000 also can include a power source 1038. The power source 1038 can include one or more batteries, power supplies, power cells, and/or other power subsystems including alternating current ("AC") and/or direct current ("DC") power devices. The power source 1038 also can interface with an external power system or charging equipment via a power I/O component 1040. Because the mobile device 1000 can include additional and/or alternative components, the above embodiment should be understood as being illustrative of one possible operating environment for various embodiments of the concepts and technologies described herein. The described embodiment of the mobile device 1000 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1000 or other devices or computers described herein, such as the computer system 600 described above with reference to FIG. 6. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1000 in order to store and execute the software components presented herein. It is also contemplated that the mobile device 1000 may not include all of the components shown in FIG. 10, may include other components that are not explicitly shown in FIG. 10, or may utilize an architecture completely different than that shown in FIG. 10.

Based on the foregoing, it should be appreciated that aspects of autonomous vehicle pairing management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
  initiating, by a fleet pairing management application executed by a processor of an autonomous vehicle, a fleet pairing process with a plurality of other autonomous vehicles, each executing one of a plurality of other fleet pairing management applications;
  sending, by the fleet pairing management application, over a network, an initiate network pairing request to the plurality of other autonomous vehicles;
  receiving, by the fleet pairing management application, a confirm network pairing response from at least one other autonomous vehicle of the plurality of other autonomous vehicles; and
  establishing a fleet comprising the autonomous vehicle and the at least one other autonomous vehicle of the plurality of other autonomous vehicles.

2. The method of claim 1, wherein the initiate network pairing request comprises a security credential, the confirm network pairing response comprises a security credential, or both the initiate network pairing request and the confirm network pairing response comprise security credentials.

3. The method of claim 1, wherein the network comprises a packet data network.

4. The method of claim 1, wherein the network comprises a mobile telecommunications network.

5. The method of claim 1, further comprising sharing data among the fleet.

6. The method of claim 5, wherein the data comprises vehicle data associated with a vehicle system, a vehicle sensor, or both the vehicle system and the vehicle sensor.

7. The method of claim 6, wherein the data further comprises map data.

8. The method of claim 7, further comprising:
  detecting, by the fleet pairing management application, an exception condition derived from the data;
  determining, by the fleet pairing management application, an exception condition response that mitigates the exception condition; and
  providing, by the fleet pairing management application, the exception condition response to the at least one other autonomous vehicle of the plurality of other autonomous vehicles, wherein the at least one other autonomous vehicle of the plurality of other autonomous vehicles executes the exception condition response.

9. A computer-readable storage medium comprising instructions of a fleet pairing management application that, when executed by a processor of an autonomous vehicle, cause the processor to perform operations comprising:
- initiating a fleet pairing process with a plurality of other autonomous vehicles, each executing one of a plurality of other fleet pairing management applications;
- sending, over a network, an initiate network pairing request to the plurality of other autonomous vehicles;
- receiving a confirm network pairing response from at least one other autonomous vehicle of the plurality of other autonomous vehicles; and
- establishing a fleet comprising the autonomous vehicle and the at least one other autonomous vehicle of the plurality of other autonomous vehicles.

10. The computer-readable storage medium of claim 9, wherein the initiate network pairing request comprises a security credential, the confirm network pairing response comprises a security credential, or both the initiate network pairing request and the confirm network pairing response comprise security credentials.

11. The computer-readable storage medium of claim 9, wherein the operations further comprise sharing data among the fleet.

12. The computer-readable storage medium of claim 11, wherein the data comprises vehicle data associated with a vehicle system, a vehicle sensor, or both the vehicle system and the vehicle sensor.

13. The computer-readable storage medium of claim 12, wherein the data further comprises map data.

14. The computer-readable storage medium of claim 13, wherein the operations further comprise:
- detecting an exception condition derived from the data;
- determining an exception condition response that mitigates the exception condition; and
- providing the exception condition response to the at least one other autonomous vehicle of the plurality of other autonomous vehicles, wherein the at least one other autonomous vehicle of the plurality of other autonomous vehicles executes the exception condition response.

15. An autonomous vehicle comprising:
- a processor; and
- a memory comprising instructions of a fleet pairing management application that, when executed by the, cause the processor to perform operations comprising:
  - initiating a fleet pairing process with a plurality of other autonomous vehicles, each executing one of a plurality of other fleet pairing management applications;
  - sending, over a network, an initiate network pairing request to the plurality of other autonomous vehicles;
  - receiving a confirm network pairing response from at least one other autonomous vehicle of the plurality of other autonomous vehicles; and
  - establishing a fleet comprising the autonomous vehicle and the at least one other autonomous vehicle of the plurality of other autonomous vehicles.

16. The autonomous vehicle of claim 15, wherein the initiate network pairing request comprises a security credential, the confirm network pairing response comprises a security credential, or both the initiate network pairing request and the confirm network pairing response comprise security credentials.

17. The autonomous vehicle of claim 15, wherein the operations further comprise sharing data among the fleet.

18. The autonomous vehicle of claim 17, wherein the data comprises vehicle data associated with a vehicle system, a vehicle sensor, or both the vehicle system and the vehicle sensor.

19. The autonomous vehicle of claim 18, wherein the data further comprises map data.

20. The autonomous vehicle of claim 19, wherein the operations further comprise:
- detecting an exception condition derived from the data;
- determining an exception condition response that mitigates the exception condition; and
- providing the exception condition response to the at least one other autonomous vehicle of the plurality of other autonomous vehicles, wherein the at least one other autonomous vehicle of the plurality of other autonomous vehicles executes the exception condition response.

\* \* \* \* \*